J. S. FRENCH.
Traction Wheel.
No. 102,107.
Patented April 19, 1870.
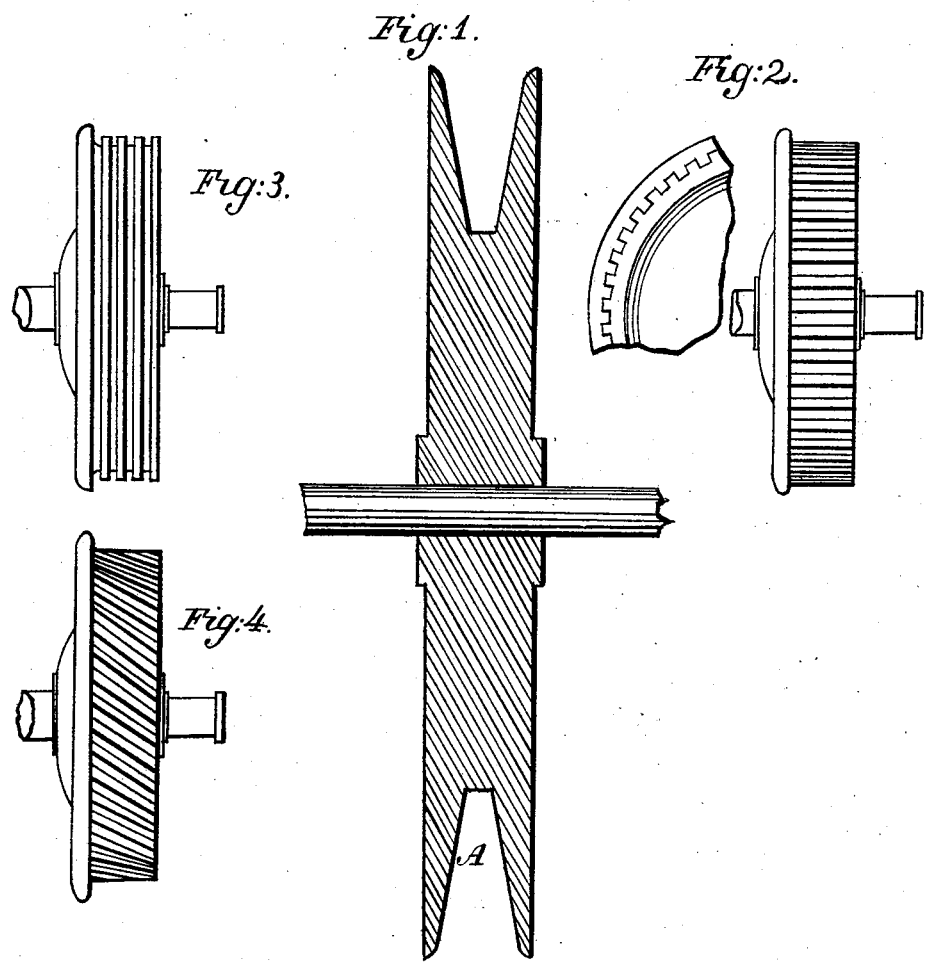

United States Patent Office.

JAMES S. FRENCH, OF ALEXANDRIA, VIRGINIA.

Letters Patent No. 102,107, dated April 19, 1870.

IMPROVEMENT IN WHEEL FOR LOCOMOTIVE LAND CONVEYANCE, AND COAL-HOISTING APPARATUS.

The Schedule referred to in these Letters Patent and making part of the same

I, JAMES S. FRENCH, of the city of Alexandria, in the county of Alexandria and State of Virginia, have invented certain Improvements in the Construction of the Driving-Wheels of Locomotives-Engines for Railroads and for Coal-hoisting Apparatus on inclined planes, and in the Construction of Wheels for Land Conveyance, either on railroads or common roads, of which the following is a specification.

Nature and Object of the Invention.

The object of my invention is to increase the adhesion of the driving-wheels of locomotive-engines on railroads to the rails by mechanical means, and this without the addition of any supplemental wheels or rails or other expensive machinery, such as has often been used or suggested to effect the same object. I propose to do this by merely changing the form of the tire or tread of the driving-wheels by a simple alteration in the surfaces of the tire or tread, and to apply them to the common rails now used on railroads, so that locomotive-engines shall work more readily high grades than they can now do, and may at all times be made to work up to their steam-power or capacity, whether on level lines or on inclines, regardless of the condition of the rails from the effects of the weather. If this be accomplished, then the adhesion of the wheels to the rails, not being due solely to the weight of the engine, as at present, it follows that the weight of engines used for the transportation of passengers and light freights, may be gaeatly reduced, if not those also for heavy traffic, thus saving much expense in the working of railroads and in the wear of the rails.

Figure 1 shows a wheel constructed on my plan, and the wedge-shaped groove A points out the difference between it and the ordinary driving-wheel of a locomotive-engine. All the driving-wheels are constructed with similar grooves, and, when they rest on the rail, the head or top of the rail fits up a short distance within the groove, and the rail acts as a wedge and is forced up in the groove by the superincumbent weight of the engine and wheels pressing down upon the rails. The sides of the groove press only on the edges of the top of the rails, in place of directly on top of the rails, as the tread or tires of the wheels now do, and the shape of the groove causes the wheels to gripe the edges of the rails, and thus increases the adhesion to a greater extent than would be due to them if they merely rested with a flat surface on the top of the rails. The sides of the groove should be regular inclines, and the head of the rail must not project up to the bottom of the groove, for if it does, unless the sides of the grooves are made to support the weight, it is but a common grooved wheel in which there is no novelty. There should be a sufficient space left between the top of the rail and the bottom of the groove to accomodate the wear of the wheels and rails; what that should be, experience will show.

This is a simple application of a well-known mechanical power in which the line of rails is made the wedge, and the object to be acted on is the wheel; and the adhesion is in proportion to the power or weight which presses the wheels down upon the rails.

As the wheels do not rest directly on the top of the rails, but on the outer edges of the top, they will be little affected by ice or wet, greasy weather, or light snows, such as can be swept from the track.

To prevent the grooves from ever becoming filled up or clogged, a scraper should be attached to some suitable part of the engine, fitting in the groove, and kept in place by a spring.

It is apparent that this arrangement is applicable to all forms of rails now in use that are elevated enough to give room for the flanges. There are some chairs which rise up to the top of the rails, and some of the switches or turnouts present difficulties, but they can readily be remedied; and probably the driving-axles may require some lateral play. Solid-headed rails will be best, and the edges may be a little flattened, if desirable, and steel tires and rails will best resist wear.

Adhesion being produced as above described, it will become unnecessary to connect several pair of driving-wheels together, as is now universally done. The gripe of the wheels upon the rails being so great would lead to the impression that they had a tendency to tear up the rails, but there is no effect of this sort, because the gripe is directly under the center of pressure, and always continues so.

I propose, in connection with this plan, to use a single track or line of rails, and to do this, I place the driving-wheel or wheels directly under the center of the engine, or so place them that they shall support the principal part of the weight of the engine. Then the engine, which is nearly balanced, must be supported on each side by common wheels turning on independent axles, or the axle of the driving-wheel may be extended out and made to carry the balancing-wheels.

The cars are supported on the single rail, and kept on it by double-flanged wheels, and supported or balanced by common road-wheels, as above described.

A great advantage to be derived from this single-track railroad is, that very short curves may be readily worked, it may be constructed to occupy very little space, and, when located on the banks of a canal, may be used for towing purposes or moving freight, as required. It will be a cheap road, and may be constructed to quarries, mines or coal-beds, and working, as proposed, by mechanical adhesion, it may be easily built over turnpike roads and adapted to light traffic without changing, to any extent, the grades of the roads.

As the rails on the plan proposed will constantly act on the principle of the wedge, they will tend to split or divide the wheels along the groove; this must be guarded against by making the tire of good material, and sufficiently strong to resist the pressure.

I am aware of the various plans which have been suggested for the purpose of accomplishing the object I have in view, having myself experimented a good deal, and given my attention to this subject at different times for nearly twenty years. Among the plans, I remember several which appear at the first glance at the drawings, to have anticipated mine; but an analysis or even careful inspection of these cases, will show a very marked difference between them and mine. I refer to the patents of Elisha Towns, in 1837; Ketchum, in 1839; one by —— Kimber, date not recollected; a rejected application of William M. Spalding and William M. Barron, in 1848; and an English patent by —— James, of about the same date, or prior to it. In these cases there are double-flanged or grooved wheels, but the grooved wheels are attached to the driving-axle and run on separate lines of rails, so that each axle has four driving-wheels, requiring four lines of rails. These grooved wheels are used only on the heavy grades of the road, and at such points a double set of rails must be used. Those for the grooved wheels must be elevated, so that the locomotive, on ascending the grade, is supported on the elevated rails, and lifts up from the regular track the common drivers, which are substituted by the grooved wheels of much less diameter, claiming thereby to increase the effective power of the engine, by simply reducing the diameter of the driving-wheels. None of these plans propose in any way to affect level lines, their sole use being confined to heavy grades, and are, as before stated, essentially different from mine.

Another part of my invention consists in a modification or change in the mode of constructing railroad car-wheels, as well as wheels for land conveyance generally.

Railroad wheels are very destructive to the rails from the constant hammering of the iron tire or tread on the rails; they likewise create a very unpleasant jarring and noise, which I think may be remedied. Wooden wheels and elastic bands of India rubber confined to the tread of the wheels by flanges, and imbedded in the tires and confined in a dovetailed groove have been tried, but I think the object is better accomplished, and more cheaply, as follows:

I make a series of parallel rectangular grooves throughout the tire, as shown in Figure 3, or they may be made round in the bottom, and these grooves I fill with cotton or hempen rope, the fibers of which are cemented together by boiled tar or pitch or other adhesive matter, and compressed until they are made solid and shaped to fit tight in the grooves. This may be readily done by passing the rope between rollers constructed for the purpose. The ropes are then cut in lengths to fill the grooves, and forced into them by machinery or with a common calking-hammer and chisel, as one would calk the seams of a ship.

Cotton is capable of being made very solid by pressure, and at the gin-houses on cotton plantations there is always a quantity of refuse cotton too dirty and full of trash for shipping, which would answer the purpose here suggested; so, also, will the worn or old cordage of vessels. The ends of the ropes may be confined in any practical way, or simply by a metallic cap, the ropes subjected to heavy pressure to make them solid, would, by their mere expansive property, remain firmly secured in the grooves. Any required repair may be made with oakum and a calking-tool, as suggested.

Figure 2 shows a modification of this plan, in which the grooves run across the tire, and at right angles to the flange; and Figure 4, a modification in which the grooves run diagonally transverse.

It is obvious that such a mode of construction would give additional or increased adhesion to the driving-wheels of locomotives, and serve to preserve car-wheels, and, at the same time, the rails, for the packing in the grooves would spread over and form a thin covering for the tire, which would be coated with dust and cemented by the pitch or adhesive matter. The same arrangement may be applied to the wheels of land conveyances, omnibuses, carriages and velocipedes, and serve to diminish the wear of the tire, the grooves in all which wheels may be made in the tire by rollers constructed for the purpose.

I claim—

1. The wedge-shaped groove A, constructed in the driving-wheels of locomotive-engines, in combination with the rails on which they run, substantially as described, for the purpose set forth.

2. The construction of a single-track railway in which my wedge-shaped drivers are used, in combination with common road-wheels, substantially as described.

3. The grooves constructed in car-wheels and wheels for land conveyance, whether cast in the wheels or rolled in the tire, substantially as described, and for the purpose set forth.

4. The material for packing the grooves with, substantially as described, when employed as herein set forth.

JAMES S. FRENCH.

Witnesses:
P. C. CLAUGHTON,
R. S. STRONGFELLOW.